UNITED STATES PATENT OFFICE.

LUDWIG TAUB, OF ELBERFELD, GERMANY, ASSIGNOR TO FARBENFABRIKEN VORM. FRIEDR. BAYER & CO., OF ELBERFELD, GERMANY, A CORPORATION OF GERMANY.

ESTER FROM CHAULMOOGRA-OIL.

957,633.  Specification of Letters Patent.  Patented May 10, 1910.

No Drawing. Application filed February 9, 1909. Serial No. 476,980. (Specimens.)

*To all whom it may concern:*

Be it known that I, LUDWIG TAUB, doctor of philosophy, chemist, citizen of the German Empire, residing at Elberfeld, Germany, have invented new and useful Improvements in Esters from Chaulmoogra-Oil, of which the following is a specification.

As is known chaulmoogra-oil (obtained from the seeds of *Taraktogenos Kurzii*) is largely used in the treatment of leprosy and various skin diseases. This oil however, has the disadvantage for its use in medicine, that it is of a butter like consistency which renders it useless for subcutaneous injection and that it shows acid reaction. Furthermore it has a very tenacious disagreeable odor and an unpleasant taste.

I have now found that neutral valuable therapeutic products can be obtained from chaulmoogra-oil in the following way: The chaulmoogra-oil is saponified by a suitable treatment with alkalies or steam and subsequently transformed into the free acids. The mixture of acids thus obtained is then freed from the malodorous by-products by treatment with steam or by washing with hot water and is then converted into esters by esterification in the usual way *e. g.* by treatment with methyl- ethyl- or propyl-alcohol and sulfuric acid. By distillation *in vacuo* pure neutral almost odorless, tasteless and colorless limpid oils are obtained which can also be used for subcutaneous injections. The new preparations have proved to be very valuable remedies against leprosy, an average dose being from 1 to 3 grams. They are insoluble in water and soluble in ether and alcohol.

The new esters can be saponified in the usual way and the free fatty acids precipitated by means of sulfuric acid. If the mixture of free fatty acids is then subjected to fractional crystallization from alcohol, chaulmoogric acid can be isolated therefrom. This acid has been described by Power and Gornall (*Journal of the Chemical Society*, 85 I. 1904, p. 846.) It has the formula $C_{18}H_{32}O_2$ and melts at 68° C.

In carrying out my new process practically I can proceed as follows, the parts being by weight:—

Example: One part of chaulmoogra-oil is saponified by heating it with a 10 per cent. alcoholic caustic potash lye. The resulting soap is dissolved in water, the solution is acidulated with dilute hydrochloric acid and the precipitate is washed with hot water or treated with steam until the disagreeable odor has disappeared. For the preparation of the mixture of ethyl esters the well dried mixture of acids is heated on the water-bath for about 12 hours with three times its quantity of ethyl alcohol and a small quantity of a mineral acid. The mixture of esters thus obtained is shaken with a solution of sodium carbonate and then with water until it is completely neutral and it is then distilled under reduced pressure. It passes over at from 190–220° C. at a pressure of 15 mm. as a colorless, almost odorless and tasteless limpid oil of neutral reaction. It is practically insoluble in water and soluble in alcohol and ether.

The process is carried out in an analogous way for the preparation of other alkyl esters *e. g.* the methyl and the propyl esters. Other modes of esterification or saponification or purification may be used.

Having now described my invention and in what manner the same is to be performed, what I claim as new, and desire to secure by Letters Patent is:—

1. The herein-described process of producing esters from chaulmoogra-oil, which process consists in first saponifying chaulmoogra-oil, secondly acidulating and purifying the mixture of acids thus obtained, thirdly esterifying the mixture of acids thus purified and finally distilling the esters *in vacuo*.

2. The herein-described process of producing a preparation from chaulmoogra-oil, which process consists in first saponifying chaulmoogra-oil, secondly acidulating and purifying the mixture of acids thus obtained, thirdly esterifying the mixture of acids thus purified with ethyl alcohol to obtain the mixture of ethyl esters and finally distilling these ethyl esters *in vacuo*.

3. The herein-described mixture of almost odorless and tasteless esters from chaulmoogra-oil, which is a limpid neutral oil, soluble in ether and in alcohol, insoluble in water, yielding on saponification a mixture containing fatty acids from which chaulmoogric acid of the formula $C_{18}H_{32}O_2$ and the melting point of 68° C. may be isolated; and exhibiting valuable therapeutic properties.

4. The herein-described almost odorless and tasteless mixture of ethyl esters obtainable from chaulmoogra-oil, which is a limpid neutral colorless oil; boiling at 190 to 220° C. under a pressure of about 15 mm., soluble in alcohol and ether, and insoluble in water; and exhibiting valuable therapeutic properties.

In testimony whereof I have hereunto set my hand in the presence of two subscribing witnesses.

LUDWIG TAUB. [L. S.]

Witnesses:
OTTO KÖNIG,
W. W. BOUNSWIETZ.